B. W. HARTLEY.
TIRE CHAIN.
APPLICATION FILED NOV. 1, 1918.

1,302,364.
Patented Apr. 29, 1919.

Inventor,
B. W. Hartley
By J. Edward Maybee
Atty.

UNITED STATES PATENT OFFICE.

BERNARD WILLIAM HARTLEY, OF HAILEYBURY, ONTARIO, CANADA.

TIRE-CHAIN.

1,302,364.  Specification of Letters Patent.  Patented Apr. 29, 1919.

Application filed November 1, 1918. Serial No. 260,728.

*To all whom it may concern:*

Be it known that I, BERNARD W. HARTLEY, of the town of Haileybury, in the Province of Ontario, Canada, have invented certain new and useful Improvements in Tire-Chains, of which the following is a specification.

This invention relates to chains applied to pneumatic tires to give a tractive grip on slippery roads and to prevent skidding and side slipping. While the chains commonly employed give sufficient tractive grip, they are deficient in side grip and possess certain disadvantages which it is my object to overcome as far as possible.

In designing my tire chain, I have aimed at satisfying the following requirements:—
 1. Effective tractive grip;
 2. Effective side grip;
 3. A reduction of the bumping effect of the ordinary cross chains;
 4. The avoidance of knobs of chain under the tread;
 5. The maintenance of proper tension on all parts of the chain.

I attain my objects by means of the constructions hereinafter described and illustrated in the accompanying drawings in which—

Figure 1:
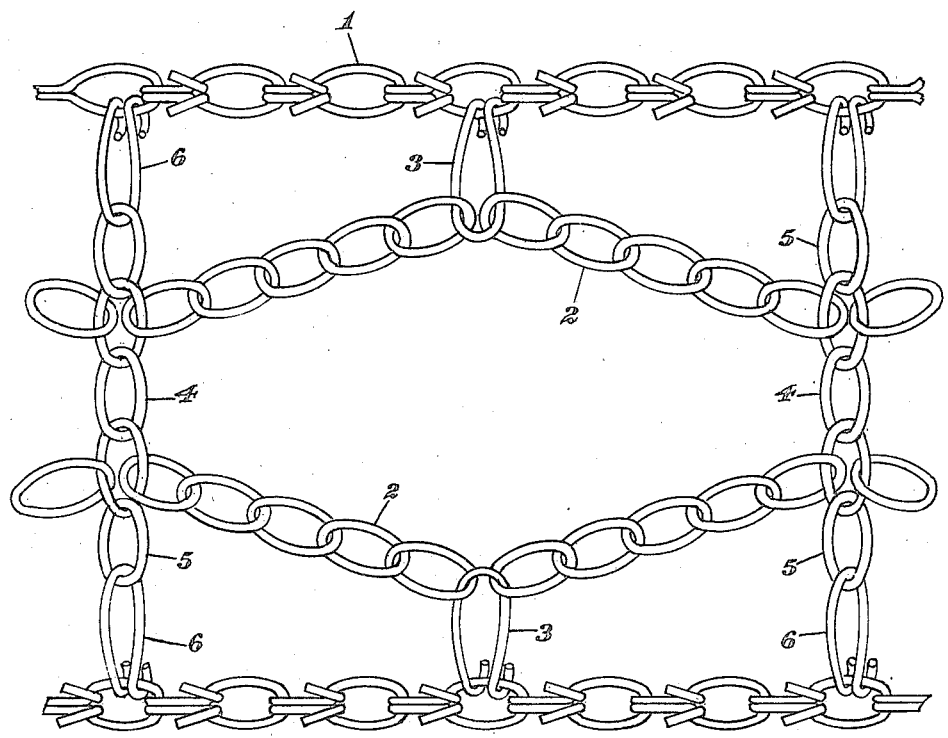
Figure 2:
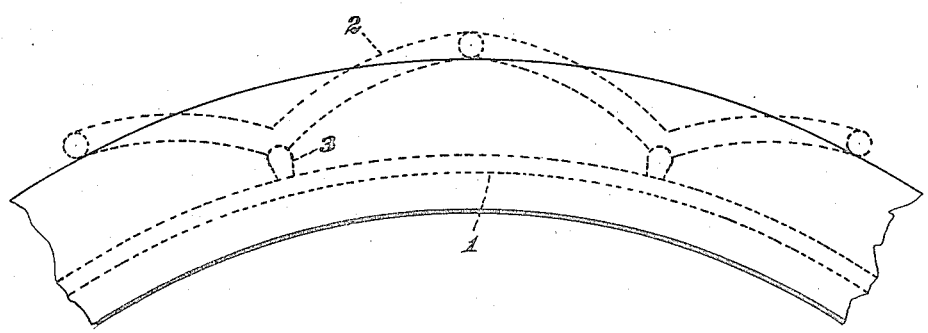

Figure 1 is a plan view of part of my improved tire chain as it would appear laid out on a flat surface; and Fig. 2 a diagrammatical side elevation illustrating the operation of the chain.

In the drawings like numerals of reference indicate corresponding parts in the different figures.

Referring particularly to Fig. 1, 1 are circular side chains, which may be of any ordinary construction, and which, when in use, will be connected in any manner known in the art. 2 are zig zag chains located one at each side of the central portion of the tread of the tire with which the device is used. The salient angles of these chains are connected with the side chains by means of hooks 3. Their reëntrant angles are connected by short transverse chains 4. From this construction it follows that when the side chains are suitably tightened on each side of a pneumatic tire, the chains 2 will be held taut and also the transverse chains connecting their reëntrant angles. Preferably also, to prevent lateral displacement, the transverse chains 4 are connected with the side chains by short pieces of chain 5 and the hooks 6 hooked into links of the side chains. The chains 4 are of such a length that upon them falls most of the work of providing traction grip. The reëntrant angles of the chains 3, however, approach so closely to the central tread portion that they are effective in providing gripping action on the roadway to prevent side slip, while, as they do not reach the central tread portion of the tire, no knobs of chain are formed over this central tread portion, so that the smooth running of the tire on the pavement is not affected by the use of these zigzag chains.

An important function of the specific arrangement of the zigzag chains will be best understood on reference to Fig. 2. It will be seen that as the parts of the zigzag chains approach the chains 4 that they approach nearer and nearer to the level of the road contacting surfaces of these transverse chains. Having in mind then the flattening of the tread of the tire due to road pressure, which reduces the tire radius at the point of contact, portions of these side chains at some distance from the transverse chains will gradually come into contact with the road surface, and the tire resting on the inclined planes thus afforded by the tire chains gradually lifts a distance equal to the thickness of the chains 4 and as gradually drops again, so that the bumping due to the sudden lifting of the tire as the ordinary transverse chains pass underneath is to a large extent avoided.

In practice the zigzag chains contact with the road surface to a sufficient extent to provide very effective resistance to side slipping and also part of the tractive grip.

It will be noted that the chains 2 are formed in sections connected by the hooks 3, so that if a break occurs anywhere in one of the zigzag chains or one of the transverse chains, a section between any two pairs of the hooks 3 is readily removed and replaced by simply disconnecting four of the hooks 3 and disconnecting the chains therefrom.

The chain constructed substantially as hereinbefore described will be found to satisfactorily attain the object of my invention as set out in the preamble of this specification.

What I claim as my invention is:

1. A non-skid chain for pneumatic tires comprising a pair of circular side chains; a pair of zig-zagged chains located to lie one at each side of the central tread portion of a tire with which the device is used; short transverse chains connecting the reëntrant angles of said chains and adapted to extend across the central tread portion of a tire; and connections between the salient angles of said chains and the side chains.

2. A non-skid chain for pneumatic tires comprising a pair of circular side chains; a pair of zig-zagged chains located to lie one at each side of the central tread portion of a tire with which the device is used; short transverse chains connecting the reëntrant angles of said chains and adapted to extend across the central tread portion of a tire; connections between the salient angles of said chains and the side chains; and connections between the ends of said transverse chains and the side chains.

Signed at Cobalt, Ontario, this 12th day of October, 1918, in the presence of the two undersigned witnesses.

BERNARD WILLIAM HARTLEY.

Witnesses:
ALBERT HALL,
H. A. SWART.